Aug. 23, 1966 F. R. FORBIS ETAL 3,267,606
IMITATION BICYCLE MOTOR
Filed July 16, 1963
Fig. 1.
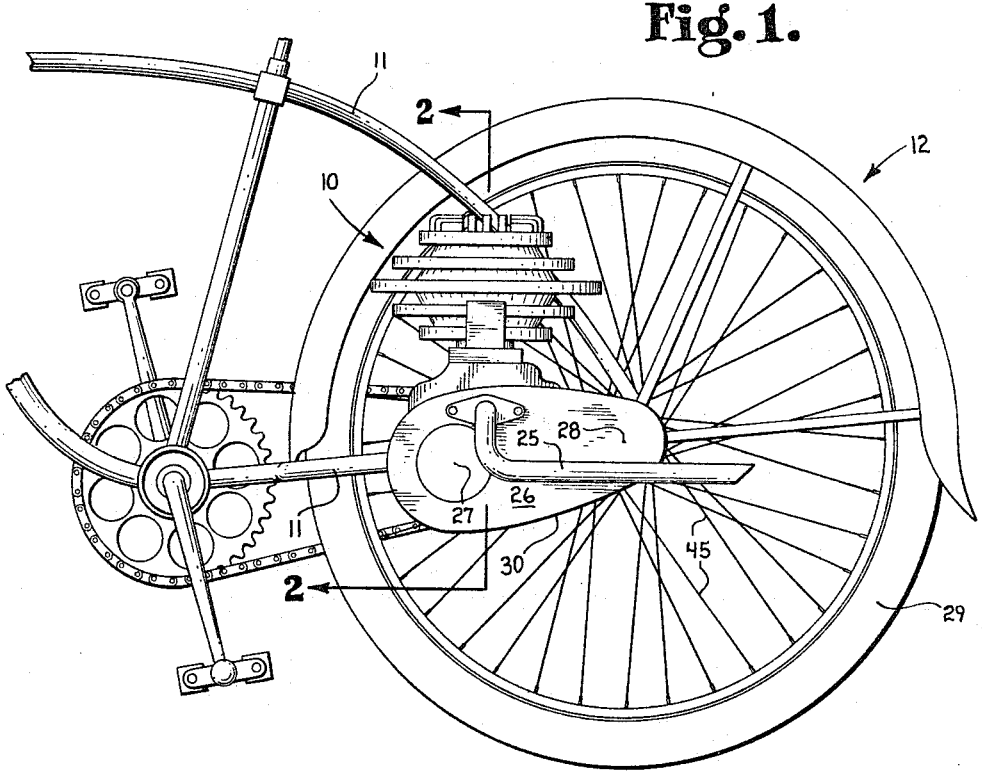
Fig. 2.
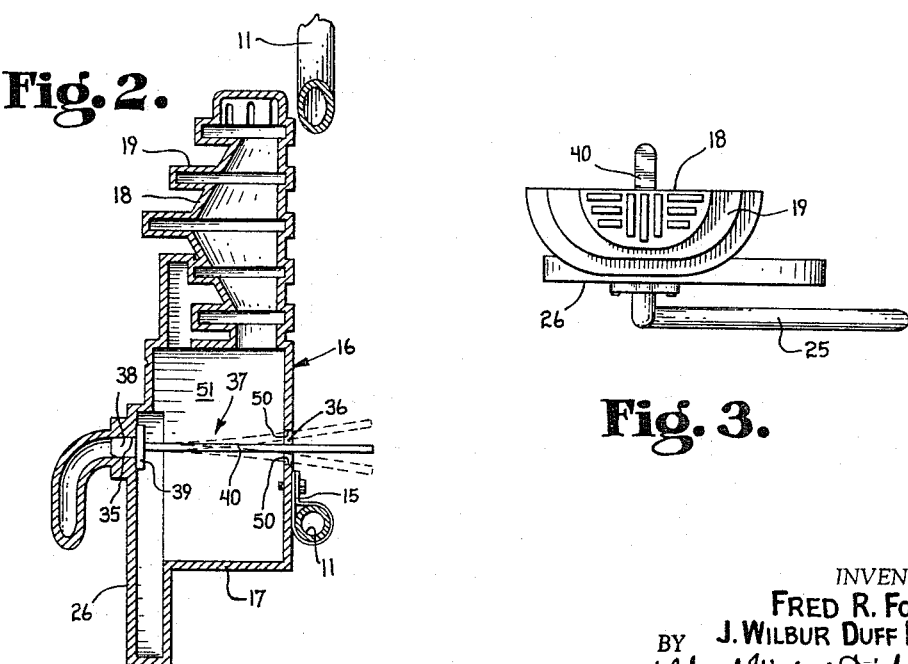
Fig. 3.
INVENTORS.
FRED R. FORBIS and
J. WILBUR DUFF ROBBINS
BY
Lockwood, Woodard, Smith & Weikart
Attorneys

2

United States Patent Office 3,267,606
Patented August 23, 1966

3,267,606
IMITATION BICYCLE MOTOR
Fred R. Forbis, Indianapolis, Ind. (203 S. Crescent Drive, Frankfort, Ind.), and J. Wilbur Duff Robbins, 4950 W. Caven St., Indianapolis, Ind.
Filed July 16, 1963, Ser. No. 295,476
1 Claim. (Cl. 46—175)

The present invention relates to a toy bicycle motor.

Most adults have at one time or another during their younger years attached a balloon or a piece of cardboard or other such object to a bicycle in such a manner that the object repeatedly strikes the spokes of the bicycle wheel as the wheel turns giving off a sound similar to that of a small motor. One object of the present invention is to provide a toy bicycle motor which makes use of this concept in such a way as to provide even greater realism. A more particular object of the present invention is to provide a toy bicycle motor which has a sound very closely approximating the sound of a real bicycle motor. A further object of the present invention is to provide a toy bicycle motor which has an appearance very close to that of a real bicycle motor.

Related objects and advantages will become apparent as the description proceeds.

One embodiment of the present invention comprises a toy bicycle motor including a hollow plastic member having an inside wall and an outside wall, said bicycle having a frame and wheel spokes, means securing said member to the frame of the bicycle with said inside wall adjacent said wheel spokes, an elongated resilient element having an enlarged head, said member having a first aperture in its outside wall and a second aperture in the inside wall, said enlarged head being press fitted within said first aperture, said elongated element extending through the hollow portion of said member and through said second aperture into the path of said spokes, said second aperture being larger than said elongated element and providing a pair of mutually facing striking surfaces for said elongated element.

The full nature of the invention will be understood from the accompanying drawings and the following description and claim.

FIG. 1 is a side elevation of the rear portion of a bicycle showing the toy bicycle motor of the present invention mounted on the bicycle.

FIG. 2 is an enlarged vertical section taken along the line 2—2 of FIG. 1 in the direction of the arrows.

FIG. 3 is a top plan view of the toy bicycle motor.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to the drawing, there is illustrated a toy bicycle motor 10 which is mounted upon the frame 11 of a bicycle 12 by suitable clamps 15. The motor 10 includes a hollow plastic body 16 which has a portion 17 simulating the crankcase of the motor and a portion 18 simulating the cylinder of the motor with its cooling fins 19.

The motor further includes an exhaust pipe 25 which extends from a rounded portion 26 formed to approximate the shape of a chain drive cover. The portion 26 is formed to include two connected circular shapes one of which has a center at 27 and the other of which has a center 28 which is aligned with the axis of the rear wheel 29 of the bicycle. Of course, the two circles whose centers are at 27 and 28 are connected by a curved portion 30 which smoothly merges with the above mentioned circles. It can be appreciated that the portion 26 appears to be a cover for a chain which is connected to the crankshaft of the motor and to a sprocket fixed with relation to the wheel 29.

The exhaust pipe 25 opens into the crankcase 17 at 35 and defines a first circular aperture. Aligned with the aperture 35 is a further aperture 36, the aperture 35 being formed in the outside wall of the motor and the aperture 36 in the inside wall of the motor. An elongated resilient element 37 has an enlarged head 38 with a collar 39. The element 37 has its head 38 press fitted within the opening 35. The elongated portion 40 of the element 37 projects through the aperture 36 and into the path of the spokes 45.

It can be appreciated that as the wheel 29 rotates, the spokes 45 engage the elongated portion 40 of the element 37 and cause it to oscillate between the dotted line positions of FIG. 2 striking the surfaces 50 and producing sounds which are reinforced by the hollow chamber 51 inside of the hollow member 16.

It will be evident from the above description that the present invention provides a toy bicycle motor which provides substantial realism. It will further be evident that the present invention provides a toy bicycle motor which has an appearance very close to that of a real bicycle motor and which produces a sound very closely approximating the sound of a real bicycle motor.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claim are also desired to be protected.

The invention claimed is:

The combination of a bicycle and a toy simulated motor, said motor comprising a hollow plastic member having an inside wall and an outside wall, a simulated exhaust pipe extending from said outside wall rearwardly of the bicycle, said bicycle having a frame and wheel spokes, means securing said member to the frame of the bicycle with said inside wall adjacent said wheel spokes, an elongated resilient element having an enlarged head and integral collar, said member having a first aperture in its outside wall which leads into said exhaust pipe and a second aperture in the inside wall, said enlarged head being press fitted within said first aperture with said collar in abutment with said outside wall, said elongated element extending through the hollow portion of said member and through said second aperture into the path of said spokes, said second aperture being larger than the cross section of said elongated element and providing a pair of mutually facing striking surfaces for said elongated element.

References Cited by the Examiner

UNITED STATES PATENTS 2,987,850   6/1961   Bergland _____ 46—175

DELBERT B. LOWE, Primary Examiner.

R. F. CUTTING, Assistant Examiner.